United States Patent Office 3,024,203
Patented Mar. 6, 1962

3,024,203
REGENERATION OF ADSORBENT MATERIAL
Harold A. Strecker, Bedford, Ohio, assignor to The Standard Oil Company, Cleveland, Ohio, a corporation of Ohio
No Drawing. Filed Nov. 12, 1958, Ser. No. 773,155
3 Claims. (Cl. 252—413)

This invention relates to a process for regenerating an adsorbent material.

In my co-pending application Serial No. 773,151, filed November 12, 1958, an adsorption process is disclosed for removing minor amounts of a solvent remaining in the product streams obtained from solvent extraction processes. As exemplary of the invention, the adsorption process is described in connection with the solvent extraction of catalytically reformed naphthas in which two separate phases are obtained. The solvent employed selectively separates the aromatic and paraffinic hydrocarbons so that the raffinate phase obtained comprises a hydrocarbon stream enriched in paraffinic content containing small amounts of the solvent, and the extract phase obtained comprises a hydrocarbon stream enriched in aromatic content containing the bulk of the solvent used. After removal of the solvent from the extract phase by means known to the art, the remaining aromatic product may be used as a valuable blending component in preparing commercial motor fuels. It is disclosed, however, that it is quite difficult to obtain a complete removal of solvent from the extract phase and, consequently, minor amounts of the selective solvent usually remain in the aromatic product. The small amount of solvent remaining in the aromatic product and in the raffinate phase will vary depending upon the solvent and process conditions selected for the extraction process and may vary widely in the range from 0.01% to about 5% by weight of the total hydrocarbon stock. It becomes, therefore, highly desirable to remove these minor amounts of solvent in order to enhance the value of the product streams.

In accordance with the adsorption process thus disclosed to accomplish this objective, the hydrocarbon liquid streams are introduced into a bed containing adsorbent particles, such as, but not limited to, charcoals, clays, bone chars, and spent catalytic cracking catalysts, wherein the solvent is removed from said streams by contact with the adsorbent particles. When the concentration of solvent in the effluent product taken from the bed exceeds a predetermined amount, the flow of hydrocarbon to the bed is discontinued and the spent adsorbent material must be replaced with fresh adsorbent material. This requires excessive amounts of adsorbent material, and it is preferable to regenerate it for use in a subsequent cycle.

It is therefore the object of this invention to provide a desorption process to remove the solvent adsorbed on a bed of adsorbent material, thereby regenerating the adsorbent materials for subsequent adsorption cycles with fresh hydrocarbon product streams.

In accordance with this invention, a desorbing liquid is passed through a bed of adsorbent material which has solvent power for the adsorbed solvent, and which has a boiling point sufficiently removed from the boiling point of the adsorbed solvent so that the two materials may be readily separated thereafter. With the practice of this invention, the selective solvent adsorbed in the adsorption cycle may be readily removed from the bed, regenerating the adsorbent material for subsequent adsorption cycles and thereby improving the over-all economics for the solvent extraction process.

The process of this invention is applicable to the desorption of the class of polar organic solvents consisting of the high-boiling hydroxyamine compounds and their derivatives. Illustrative of these compounds are phenylethanolamine, phenyldiethanolamine, triethanolamine, diethylaminoethanol, dioctylaminoethanol, ethylphenylethanolamine, monoethanolamine, diethanolamine, monoisopropanolamine, triisopropanolamine, diisopropanolaine, N-morpholinethanol, hydroxyethylethanoldiamine, triethanolamine abietate, triethanolamine naphthenate, butyl diethanolamine, N-dibutylaminoethanol, p-tertiary-amyl phenyldiethanolamine, p-tertiary-amyl phenylmonoethanolamine, diethylamino-2,3 propanediol, etc.

Of the above class of solvents, phenylethanolamine finds particular utility in the solvent extraction of catalytic reformate, and the invention will be described in connection with this solvent hereinafter.

The desired desorbing medium for this desorption process is an aqueous solution of a mineral acid. As the desorbing liquid is passed through the bed, the acid forms a salt with the selective solvent there present, which salt is soluble in the remaining acid solution so as to be carried out of the bed in the stream of desorbing liquid. Aqueous solutions of hydrochloric, nitric, sulfuric, and phosphoric acids are particularly preferred as the desorbing media in the operation of this process. The acid concentration of these aqueous acid solutions is not critical. When using an aqueous solution of hydrochloric acid, the preferred concentration of the acid in the solution is between the ranges of 5 to 35% by weight. When using the aqueous solutions of the other acids, higher concentrations of acid may be used and the preferred range of acid concentration is between 25 and 80% by weight. The desorbing medium should not be appreciably reactive with the adsorbent material, i.e., the adsorbent material should be relatively inert with respect to the desorbent. This is true of the adsorbents and desorbents mentioned herein.

Although the desorption process may be conducted at temperatures which are the same as the temperatures of the adsorption cycle, the rate of the desorption process may be significantly improved by conducting the desorption cycle on the adsorption bed at temperatures somewhat above the temperature employed for the adsorption cycle. With increased temperatures, the adsorption bonds holding the solvent to the solid particles are weakened and the solubility of solvent in the desorbing medium is enhanced. Normally, a temperature increase less than 100° F. above the temperature at which adsorption was conducted will be adequate to produce this effect, but preferably the temperature of operation is not to exceed 250° F. Desorption may generally be conducted at atmospheric pressure or at slightly increased pressures so as to maintain the desorbing medium in a liquid phase.

Further variables affecting the rate of desorption will be obvious to those skilled in the art and include the rate of flow of the desorbing medium through the bed, the viscosity of the desorbing medium, agitation of the desorbing medium within the adsorbent bed, and the selection of particle size of the adsorbent material. Conditions and variables controlling the desorption process can normally be selected so that the time of the desorption cycle can equal the time for the adsorption cycle. Therefore, by using two adsorption beds the treatment of the product streams may be continuous in that one bed may be undergoing adsorption while the second bed is being desorbed.

A more complete understanding of the operation of the invention will be gained from the following working example.

An adsorption bed having a volume of 75 ft.$^3$ and containing 2800 lbs. of charcoal with a particle size in the range of 20 to 200 mesh adsorbed 570 lbs. of phenylethanolamine from an adsorption cycle in which the bed contacted a n-heptane hydrocarbon stream containing 0.3% phenylethanolamine for 10 hours at a flow rate of 80 bbl./hr. The temperature of the bed during the adsorption cycle was maintained at 80° F. Desorption was conducted using 10% aqueous hydrochloric acid as the desorbing liquid, maintaining the temperature constant at 80° F. The aqueous hydrochloric acid solution was introduced to the bed at a flow rate of 40 bbl./hr. 92% of the phenylethanolamine, or 524 lbs., was removed from the bed by the first 40 bbls. of acid solution passed through the bed, and desorption was continued up to 10 hours, or the equivalent time of the preceding adsorption cycle during which an additional 45.7 lbs. of phenylethanolamine was removed from the bed, making the total removal of phenylethanolamine 99.95% of that adsorbed during the adsorption cycle.

After the desorption cycle, some unreacted acid normally remains adsorbed on the adsorbent particles in the bed. This residual amount of acid will react with the first amounts of phenylethanolamine present in the stream of hydrocarbons entering the bed when an adsorption cycle is started, forming salts. These salts will remain on the adsorbent particles until the subsequent desorption cycle with fresh acid solution at which time they, together with adsorbed phenylethanolamine, will be freed from the adsorbent particles and removed from the bed in the stream of desorbing liquid.

It will be obvious to those skilled in the art that various modifications of the process described herein may be readily made, and all such modifications are intended to be covered by this invention as may reasonably be included within the scope of the appended claims.

I claim:

1. A desorption process for removing a hydroxyamine solvent adsorbed in a bed of adsorbent materials from a hydrocarbon stream comprising predominantly normally liquid hydrocarbons and a minor amount of said solvent, comprising the step of passing through said bed as a desorbing liquid which is substantially unreactive with the adsorbent materials in said bed an aqueous solution consisting essentially of water and a mineral acid.

2. A desorption process for removing phenylethanolamine adsorbed in a bed of adsorbent materials from a hydrocarbon stream comprising predominantly normally liquid hydrocarbons and a minor amount of phenylethanolamine, comprising the step of passing through said bed as a desorbing liquid which is substantially unreactive with the adsorbent materials in said bed an aqueous solution consisting essentially of water and hydrochloric acid at a temperature below 250° F., and separating said desorbing liquid from the phenylethanolamine.

3. The process of claim 2 in which the adsorbent material is selected from the group consisting of charcoal, clay, bone char, and spent catalytic cracking catalyst.

References Cited in the file of this patent

UNITED STATES PATENTS 2,789,144     Gorin et al. _____ Apr. 16, 1957